United States Patent [19]
Howeth
[11] Patent Number: 4,694,649
[45] Date of Patent: Sep. 22, 1987

[54] PRESSURE LIMITING ACCELERATION CONTROL SYSTEM AND VALVE FOR HYDRAULIC MOTORS

[76] Inventor: David F. Howeth, 233 Chuck Wagon Trail, Fort Worth, Tex. 76108

[21] Appl. No.: 861,646

[22] Filed: May 2, 1986

Related U.S. Application Data

[63] Continuation of Ser. No. 463,739, Feb. 4, 1983, abandoned.

[51] Int. Cl.[4] ........................ F16D 31/02; F16K 31/12
[52] U.S. Cl. ........................ 60/468; 60/494; 91/35; 91/433; 91/452; 137/505.13
[58] Field of Search ........................ 60/468, 494; 91/35, 91/433, 451, 452; 137/505.13

[56] References Cited

U.S. PATENT DOCUMENTS

| | | | |
|---|---|---|---|
| 1,942,426 | 1/1934 | Hunter et al. | 137/625.3 |
| 3,118,466 | 1/1964 | Bagwell | 137/505.13 X |
| 3,559,677 | 2/1971 | Barosko | 137/505.13 |
| 3,791,413 | 2/1974 | Muller et al. | 137/625.3 |
| 3,890,788 | 6/1975 | Habiger | 60/468 |
| 4,002,027 | 1/1977 | Eley et al. | 60/468 X |
| 4,245,816 | 1/1981 | Johnson | 137/625.3 |
| 4,362,018 | 12/1982 | Torii | 60/468 |
| 4,417,502 | 11/1983 | Shore | 91/452 |
| 4,466,336 | 8/1984 | Broome et al. | 91/452 |

*Primary Examiner*—Allen M. Ostrager
*Attorney, Agent, or Firm*—Hubbard, Thurman, Turner & Tucker

[57] ABSTRACT

A control system for operating positive displacement hydraulic motors to minimize pressure peaks and stresses associated therewith upon starting the motor at full fluid flow includes a self-closing pilot operated valve which, upon initiation of fluid flow to the motor bypasses a majority of the flow to a return line circuit and progressively closes to force pressure fluid to accelerate the motor to a preselected operating speed. The self-closing valve includes a spool type closure member which is pilot actuated through a timing orifice to commence closing upon initiation of fluid flow therethrough from the pump discharge or supply line. The closure member is spring biased in the open position and automatically resets itself to the open position upon shutdown of the motor operating valve.

15 Claims, 8 Drawing Figures

PRESSURE LIMITING ACCELERATION CONTROL SYSTEM AND VALVE FOR HYDRAULIC MOTORS

CROSS-REFERENCE TO RELATED APPLICATION

This application is a continuation of U.S. application Ser. No. 463,739 filed on Feb. 4, 1983 now abandonned.

BACKGROUND OF THE INVENTION

1. Field of the Invention

The present invention pertains to a hydraulic control system including a valve for minimizing rapid increases in system pressure caused by the sudden application of full fluid flow to a motor or actuator.

2. Background

There are many hydraulic circuits wherein linear or rotary actuators and motors are subject to being turned on by the sudden application of full system fluid flow imposed on the motor or actuator inlet line. This sudden application of full fluid flow caused by, for example, the movement of an on-off throttling valve to the fully open position creates extremely rapid and sharp increases in system pressure imposed on the motor or actuator and the upstream hydraulic circuitry. This rapid rise in pressure, if even only momentary, repeated often enough causes fatigue failures in various parts of the system including the motor or actuator itself, the supply piping or hoses and on component parts of the load connected to the motor.

Even though most conventional hydraulic systems are provided with pressure limiting or relief valves these valves are designed to be normally in a closed condition and their operating response time is insufficient to reduce or eliminate sharp increases or spikes in system pressure between the fluid supply pump and the motor upon initiation of supplying hydraulic fluid to the motor.

The abovedescribed phenomena has been a longstanding problem in the art of hydraulic control systems and is particularly troublesome in applications wherein the duty cycle of the pump and motor includes repeated on-off operation of the motor. One example is in connection with a hydraulic motor driven fan or vacuum pump used in dust collection systems for earth drilling rigs. Since these systems are normally started and stopped in relation to drilling activity the numerous events that accompany the drilling of blastholes and other drilling operations requires a severe on-off duty cycle for the dust collection system. The cyclic operation of the vacuum pump drive motor in this application has significantly shortened the life of the motor and drive components before the discovery of the control system and valve of the present invention.

There are, of course, many other applications involving cyclic on-off loading of hydraulic motors and actuators which are subject to momentary pressure peaks at the onset of startup in the range of 2.0 to 2.5 times normal system operating pressures and wherein pressures in the system are controlled only by conventional pressure limiting valves. Systems experiencing such rapid pressure increases, however brief they may be, are subject to cyclic stresses which may materially shorten the life of system components. It is to this end that the present invention has brought a solution to a longstanding problem in the art of hydraulic motors and control systems.

SUMMARY OF THE INVENTION

The present invention provides for a control system for use in conjunction with hydraulic motors which minimizes or substantially eliminates rapid increases in system pressure upon startup of the motor in systems wherein application of substantial or maximum fluid flow is suddenly applied to the motor or actuator.

In accordance with one aspect of the present invention there is provided a control circuit for hydraulic motors including a conventional on-off throttling valve and a unique flow control valve which, upon application of fluid flow to the hydraulic motor, operates to progressively shunt fluid flow from a bypass circuit to the motor inlet line to provide a cushioned acceleration of the motor and a substantial reduction in system over pressure in the motor inlet circuit.

In accordance with another aspect of the present invention there is provided a hydraulic control circuit for controlling the startup of a hydraulic motor or actuator wherein a valve is provided which is normally open to bypass full fluid flow from the pump discharge or motor supply line and which is pilot controlled to progressively close to provide a graduated increase in fluid flow to the motor or actuator so that the motor is brought up to operating speed without being subjected to stresses associated with sudden increases in fluid flow and pressure resulting from turning on a motor fluid supply valve.

In accordance with still another aspect of the present invention there is provided a unique flow control valve which is particularly adapted to operate as an acceleration or progressive flow increase valve for use in conjunction with hydraulic motors, which valve may be easily installed in conventional hydraulic motor drive circuits. The flow control valve of the present invention is adapted to provide for initial bypass of substantially all fluid flow imposed on the motor fluid inlet circuit with progressively increasing throttling of bypass flow to provide a cushioned acceleration of the driven motor and load up to the steady state operating flow and speed condition. The construction of the valve is particularly advantageous and utilizes a spool type closure member which is spring biased into a valve open and substantially unrestricted flow condition but which may be progressively moved toward a closed condition to throttle fluid flow through the valve. In one embodiment of the valve the spool type closure member is provided with a plurality of axially extending grooves which cooperate with a land or seat formed in the valve body wherein the effective flow area is progressively decreased as the closure spool is moved by pilot pressure fluid against the bias of a closure member biasing spring. An interchangeable shift control orifice is insertable in the exit or exhaust flow passage of the valve and is adapted to provide a pressure condition to effect the onset of valve closure for a particular system. The valve is pilot actuated and includes an interchangeable timing orifice in the pilot pressure fluid circuit to control the rate of valve closure.

The present invention still further provides for a flow control valve for limiting peak transient pressure conditions in a hydraulic circuit wherein the closure member itself provides the flow limiting orifice which controls the onset of valve closure movement.

In accordance with still a further embodiment of the present invention there is provided a combinatio self-closing flow control valve for controlling acceleration of a hydraulic motor or actuator, an adjustable speed control valve and a combination bypass and anticavitation or overrunning type check valve for use with hydraulic motor systems.

Those skilled in the art of hydraulic motor systems and the like will further appreciate the abovementioned advantages of the present invention as well as other superior aspects thereof upon reading the detailed description which follows in conjunction with the drawings.

DESCRIPTION OF THE PREFERRED EMBODIMENTS

Figure 1:
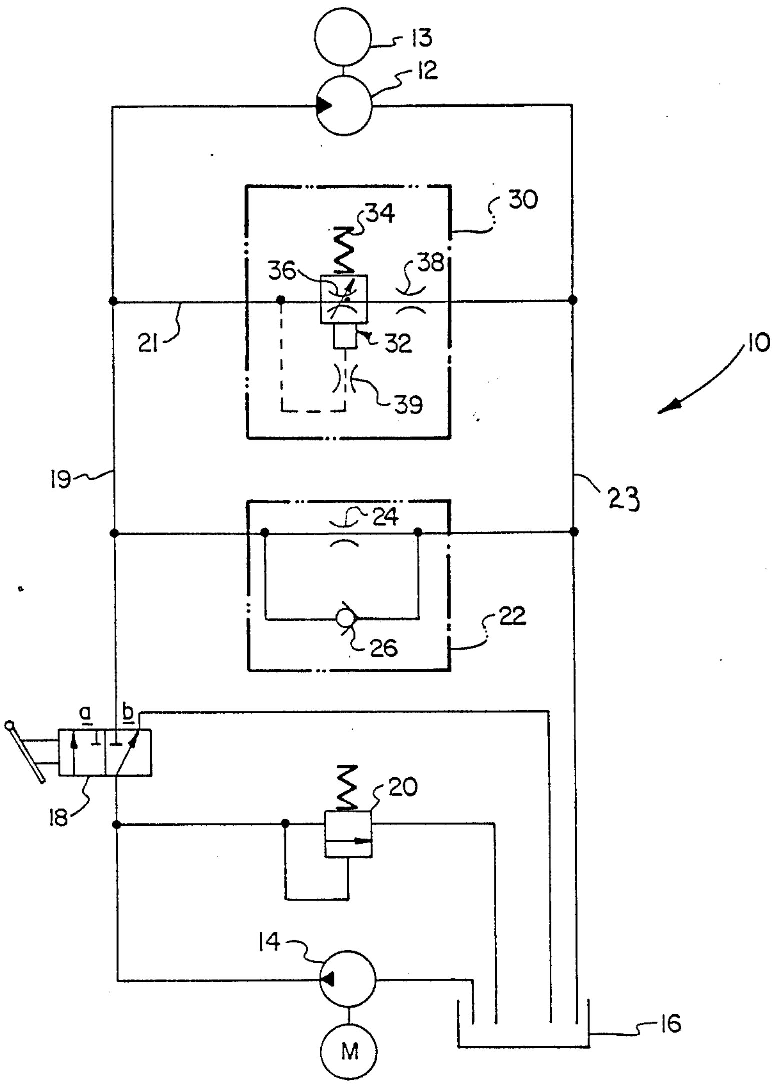
FIG. 1 is a schematic diagram of a control circuit for a hydraulic motor for minimizing rapid pressure increases in accordance with the present invention.

In the description which follows like parts are marked throughout the specification and drawings with the same reference numerals, respectively. The drawings are not necessarily to scale and certain features of the invention may be shown in diagrammatic form in the interest of clarity and conciseness.

Referring to FIG. 1 there is illustrated a schematic diagram of a hydraulic control circuit, generally designated by the numeral 10, for operating a positive displacement rotary motor 12. The motor 12 may be one of several conventional positive displacement rotary motors known in the art of hydraulic systems, or may be a linear type actuator as well. The motor 12 is adapted to be connected to a driven load such as a vacuum pump 13 for use in conjunction with a bailing air dust collection and separation system for an earth drilling rig or the like. The motor 12 is adapted to be supplied with hydraulic fluid from a pump 14 which may be a fixed displacement or variable displacement pump adapted to receive a supply of hydraulic fluid from a reservoir 16. The motor control circuit 10 also includes a conventional on-off lever actuated valve 18 for supplying hydraulic fluid to the inlet port of the motor 12 in its position a and for bypassing the pump discharge fluid back to the reservoir 16 when in its position b. A conventional normally closed pressure relief valve 20 is also shown connected to the discharge side of the pump 14 as indicated in FIG. 1.

In many applications of hydraulic motors it is desirable to limit the flow to the motor to some value less than the nominal steady state pump discharge flow. In the circuit illustrated in FIG. 1, a speed control valve for controlling or limiting the maximum speed of the motor 12 is shown in the system and generally designated by the numeral 22. The speed control valve 22 may typically comprise a fixed or variable orifice 24 and a check valve 26. The check valve 26 is arranged to permit overrunning or free wheeling of the motor 12 while minimizing cavitation in the pump supply line 19 between the valve 18 and the motor 12 in response to, for example, shifting of the valve 18 from its position a to its position b.

The motor control circuit 10 further includes a unique pressure limiting and motor acceleration control valve illustrated schematically and generally designated by the numeral 30. The valve 30 is a pilot operated self-closing valve which includes a pilot actuator 32 and a biasing spring 34 for operating a closure member indicated schematically in FIG. 1 as a variable orifice 36. The valve 30 also includes a second orifice 38 downstream of the closure member 36 in the direction of normal flow through the valve. The orifice 38 may be adjustable or comprise an interchangeable element to accommodate particular flow and pressure conditions depending on the characteristics of the motor and pump as well as other aspects of the circuit 10.

Figure 2:
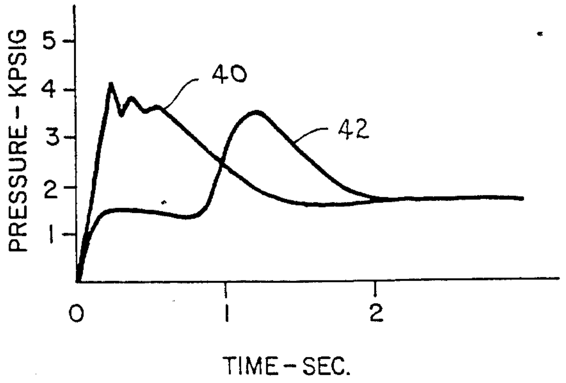
FIG. 2 is a diagram illustrating system pressures with and without the control circuit arrangement and valve of the present invention.

In a control circuit similar to that shown in FIG. 1 but without the valve 30, upon startup of the motor 12 by shifting the valve 18 from its position b to its position a, a very sharp and intense pressure increase may be experienced momentarily in the fluid supply line 19 as well as at the motor 12 even in the presence of the pressure relief valve 20 and the speed control valve 22. The inertia of the motor 12 and/or its load, and the inertia of the pressure relief valve 20 together with possibly certain other characteristics will cause the sudden pressure increase as evidenced by the diagram illustrated in FIG. 2. Referring briefly to FIG. 2, there is illustrated a pressure-time trace for a control circuit similar to the circuit 10 showing the pressure-time characteristics of the circuit with and without the valve 30. The abscissa of the diagram of FIG. 2 represents increments of time in seconds and the ordinate represents increments of pressure in thousands of pounds per square inch gage. The pressure-time trace represented by the line 40 indicates the pressure at the motor inlet for a motor driving a load such as an aerodynamic type vacuum pump or fan. The motor has a displacement of 1.15 cubic inches per revolution and the output of pump 14 is a nominal 18 gallons per minute. The steady state operating pressure is indicated to be approximately 1,700 psig for a particular predetermined setting of the speed control valve 22. As will be noted from the pressure-time trace 40 of FIG. 2 a relatively rapid increase in pressure to a value of approximately 4,200 psig occurs in approximately 0.20 seconds when opening the valve 18. However, the same circuit and same conditions utilizing the valve 30 indicates a pressure-time trace at the motor inlet port having a characteristic according to the line 42 shown in FIG. 2. As will be apparent to those skilled in the art the pressure increase imposed on the motor 12 with the valve 30 present in the circuit is substantially reduced and pressure is applied a great deal more gradually than the same system without the valve 30.

The characteristics of the valve 30 are basically such that when valve 18 is shifted from its position b to its position a, with the pump 14 delivering fluid at a steady state or normal discharge condition, flow in the supply line 19 is initially shunted back to reservoir 16 through the valve 30 which is essentially in a fully open condition. The presence of the flow restriction or orifice 38 will, however, provide sufficient resistance to flow to initiate a closing action on the valve due to the fluid pressure imposed on the pilot actuator 32. A flow control orifice 39 is interposed in the pilot line between the actuator 32 and the bypass flow line 21 leading to the valve 30. Accordingly, upon introduction of flow through the line 21 a sufficient pressure increase is experienced to cause the pilot actuator 32 to commence moving the closure member 36 to reduce the effective flow area through the valve 30. Increasing resistance to flow through valve 30 will cause the pilot actuator 32 to continue the closing action so that the valve eventually will be completely closed or closed to a predetermined position of throttling the flow of fluid through line 21. The effect of this action is to provide a gradual increase or shunting of flow to the motor 12 which provides a substantially smooth and shock free acceleration of the motor as evidenced by the characteristic of the pressure-time trace 42.

Figure 3:
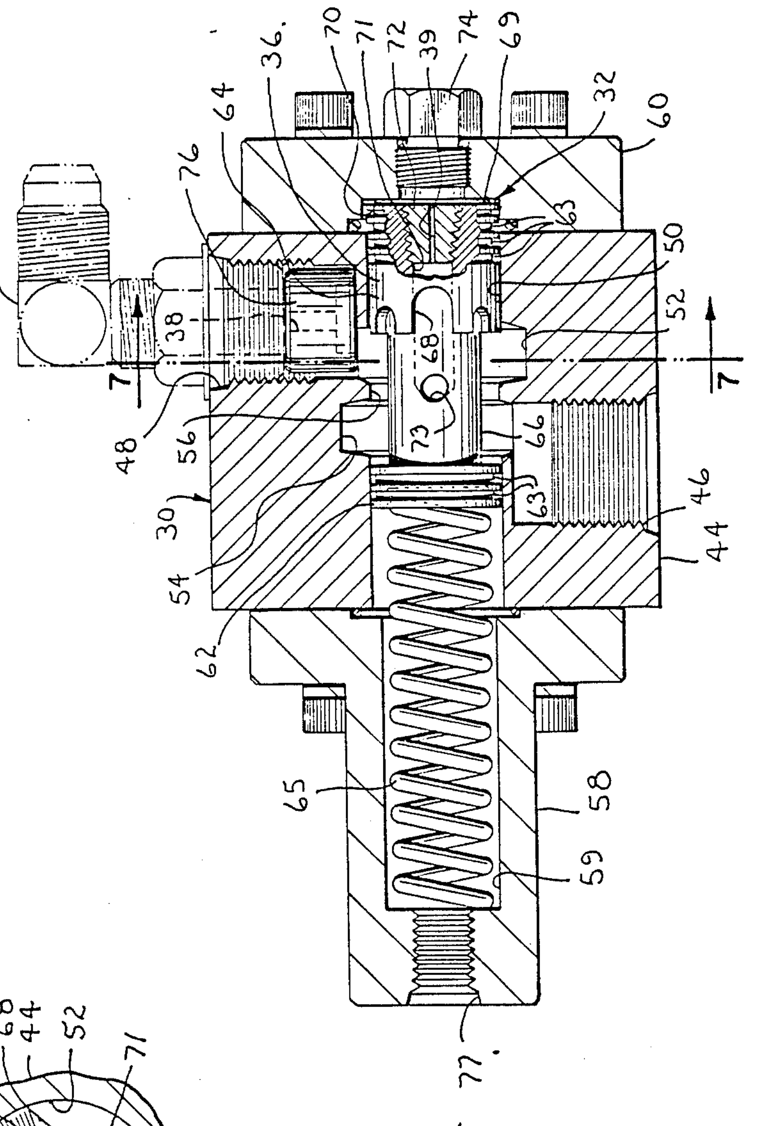
FIG. 3 is a longitudinal section view of a pressure limiting acceleration control valve adapted for use in the circuit illustrated in FIG. 1.
Figure 7:
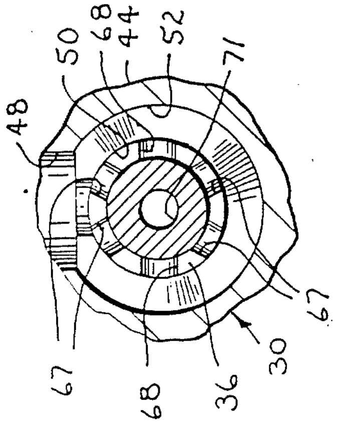
FIG. 7 is a section view taken along line 7—7 of FIG. 3.

Referring now to FIGS. 3 and 7, there is illustrated a preferred embodiment of the valve 30 which is shown in longitudinal central section and a detail cross-section, respectively. The valve 30 includes a body member 44 having a fluid inlet or supply port 46 and a fluid discharge or exhaust port 48. The ports 46 and 48 are of conventional design and are provided with suitable internal threads for connecting the valve to conventional hydraulic fluid fittings including the discharge fitting 49. The body 44 is also provided with a longitudinal bore 50 having enlarged portions 52 and 54 forming therebetween a valve seat comprising a land 56. The valve 30 also includes a housing member 58 secured to the body 44 on one face thereof and a pilot actuator chamber cover 60 secured to the body 44 on an opposing face thereof.

The closure member 36 of the valve 30 preferably takes the form of a cylindrical spool member, as shown in FIG. 3, having opposed head portions 62 and 64 which are provided with a plurality of circumferential grooves 63 forming labyrinth type seals. The closure spool 36 is slidably disposed in the bore 50 and is biased into the position shown in FIG. 3 by a biasing spring 65 acting against the head portion 62 and contained with a bore 59 in the housing 58. The closure spool 36 includes a reduced diameter portion 66 interposed between the head portions 62 and 64 to permit substantially unrestricted flow of fluid through the valve in the position illustrated in FIG. 3. The closure member head portion 64 includes a plurality of circumferentially spaced longitudinal grooves 67 and 68 formed on the periphery of the head portion 64 and which vary in length, respectively, from the point at which the grooves intersect the reduced diameter portion 66. Accordingly, upon movement of the closure member 36 toward the land 56, the cross-sectional flow area available for flow of fluid between the ports 46 and 48 is progressively decreased as the flow area of the channels formed by the grooves 67 is reduced to zero followed by a progressive decrease in the flow area of the channels formed by the grooves 68. Movement of the closure member from the position illustrated in FIG. 3 to the left, viewing FIG. 3, is accomplished by hydraulic fluid acting on the end face 69 of the head portion 64. Pilot pressure fluid is introduced into a chamber formed by the bore 50, a recess 70 in the member 60 and the closure member face 69 by way of an axially extending passage 71 in the closure member 36. An orifice plug 72 is interposed in the passage 71 and the passage 71 also opens into the bore 50 through a transverse passage portion 73. The orifice plug 72 includes a restricted bore forming the orifice 39 referenced in FIG. 1. A closure plug 74 is threadedly disposed on the member 60 and is removed for gaining access to the orifice plug 72 for interchanging same with a plug having a control or timing orifice of a different diameter without disassembling the valve 30.

The valve shifting or flow limiting orifice 38 is preferably formed in a plug 76 which may be removably insertable in the passage formed by the valve discharge port 48 and is secured in the position shown by the fitting 49 or a similar fitting threaded into the discharge port. Accordingly, the rifice plug 76 may also be interchanged relatively easily by disconnecting the aforementioned fitting from the valve body 44 and replacing the plug 76 with one having an orifice of a different size or effective flow area.

The operation of the valve 30 is believed to the substantially self-explanatory from the foregoing description of the control circuit of FIG. 1 as well as from the description of the valve component parts in conjunction with FIG. 3. However, briefly, upon introduction of pressure fluid into the inlet port 46 the fluid flows substantially unrestricted through the bore 50 to the discharge port 48 but is forced to flow through the orifice 38. The restriction imposed on fluid flow by the orifice 38 is sufficient in the system in which the valve is applied to initiate movement of the closure member 36 toward the left, viewing FIG. 3, against the bias of the spring 66 under the urging of fluid pressure acting on the closure member end face 69. The fluid at the pressure in the bore 50 is in communication with the chamber formed between the end face 69 and the recess 70 thanks to the passage 71–73 and the timing orifice 39. As the closure member 36 moves across the groove 52 the effective flow area of the passageway formed between the ports 46 and 48 is progressively decreased. The increased resistance to flow caused by such movement of the closure member results in a pressure increase which is imposed on the pressure face 69 which, in turn, urges the closure member toward the valve closed position at an increasing rate. However, the orifice 39 limits the rate of pressure increase acting on the end face 69 to control the movement of the closure member so that a relatively smooth progressive increase in fluid pressure acting on the motor 12 is experienced. As the edge of the head portion 64 encounters the land 56 flow through the chamber formed between the ports 46 and 48 occurs through the grooves 67 and 68 and further movement of the closure member to the left results in additional progressive decrease in effective flow area until the closure member is fully closed or moved to a position wherein the grooves 67 and 68 have entered the land 56 completely. The provision of the grooves 67 and 68 which are, respectively, of varied lengths provide a progressive decrease in the effective flow area for fluid passing through the valve 30 to further minimize or eliminate any abrupt increase in pressure sensed by the motor 12.

Upon shutoff of the motor 12 by, for example, shifting the valve 18 from its position a to its position b pressure in the line 19 will decrease as fluid flows through the motor speed control valve 22 back to the reservoir 16. Accordingly, flow of fluid out of the pilot chamber formed between the face 69 and the recess 70 will occur through the passage 71–73 and the valve inlet port 46. The biasing spring 65 is then effective to return the closure member 36 to the position shown in FIG. 3 in readiness for the next operating cycle of the system 10. As shown in FIG. 3 the bore 59 is adapted to be connected to a low pressure return line by way of a passage 77 to drain pressure fluid from the chamber which may leak past the closure member head portion 62.

Figure 4:
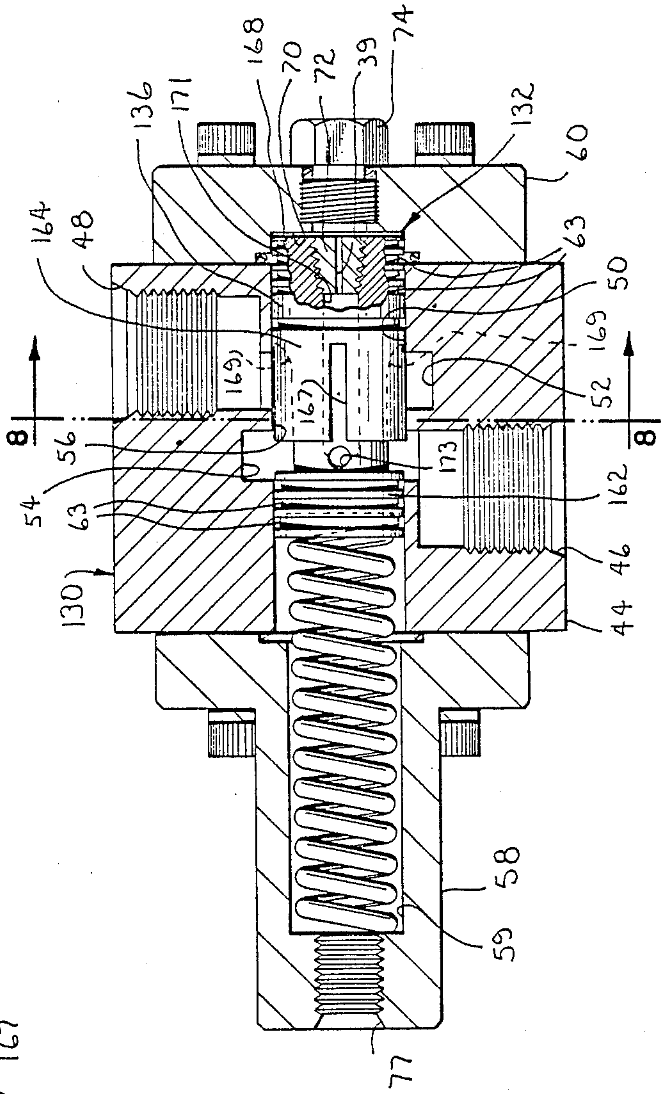
FIG. 4 is a longitudinal central section view of alternate embodiment of a pressure limiting acceleration control valve in accordance with the present invention.
Figure 8:
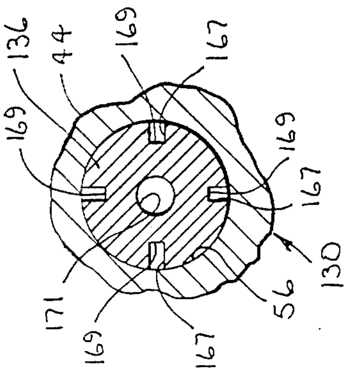
FIG. 8 is a section view taken along line 8—8 of FIG. 4.

Referring now to FIGS. 4 and 8, there is illustrated an alternate embodiment of a pressure limiting acceleration control valve, generally designated by the numeral 130. The valve 130 is similar in several respects to the valve 30 and utilizes the valve body 44, the housing member 58, the biasing spring 65, the cover member 60 and the removable plug 74. The plug 74 may be replaced by a suitable fitting for connecting the pilot actuator chamber formed in part by the recess 70 to a fluid drain line connected to an on-off control valve as described in conjunction with the system of FIG. 5. The valve 130 includes a closure member, generally designated by the numeral 136, which has spaced apart cylindrical head portions 162 and 164 slidably disposed in the bore 50 to control the flow of fluid through the valve from the inlet port 46 to the discharge or exhaust port 48. The head portion 164 of the closure member 136 is modified to extend into and through the land 56 and partially into the groove 54 when the closure member is in the valve fully open position. Accordingly, the closure member 136 is provided with four circumferentially spaced apart longitudinally extending grooves 167 each having a bottom wall 169 which tapers radially outwardly towards the circumference of the head portion 164. The closure member 136 also includes a timing orifice plug 72 threadedly disposed in a passage 171 which is in communication with a passage 173 which opens into with the inlet port 46 regardless of the position of the closure member 136 in the valve body.

In the arrangement of the valve 130 the closure member 136 provides its own valve shifting orifice formed by the grooves 167. Accordingly, with the valve 130 interposed in the control system of FIG. 1 in place of the valve 30, for example, and upon initiation of full fluid flow through the supply line 19 to the motor 12 there is sufficient flow area provided by the grooves 167 to bypass a major portion of pump discharge flow through the valve. However, the grooves 167 provide sufficient resistance to flow through the valve 130, initially, that a fluid pressure force acting on pilot actuator 132 including the closure member end face 168, by way of the passages 173–171 and the orifice 39, commences shifting of the closure member towards a position wherein flow through the valve 130 will be completely shutoff. As the closure member 136 moves to the left, viewing Figure 4, against the bias of spring 65, the effective flow area of grooves 167 is progressively decreased as the head portion 164 slides through the land 56 so that a progressive throttling effect of flow from the port 46 to the port 48 is experienced until the closure member 136 is extended sufficiently into the groove 54 to block any flow path between the groove 54 and the groove 52. Accordingly, the embodiment of the flow limiting valve illustrated in FIG. 4 may be preferred in applications wherein variation in the size of the valve shifting orifice is not required. On the other hand, of course, the closure member 136 may be interchanged with a closure member having a configuration of grooves corresponding to the grooves 167 which initially provide a greater or lesser effective flow area since these grooves are operable to function as the valve shifting orifice.

Figure 5:
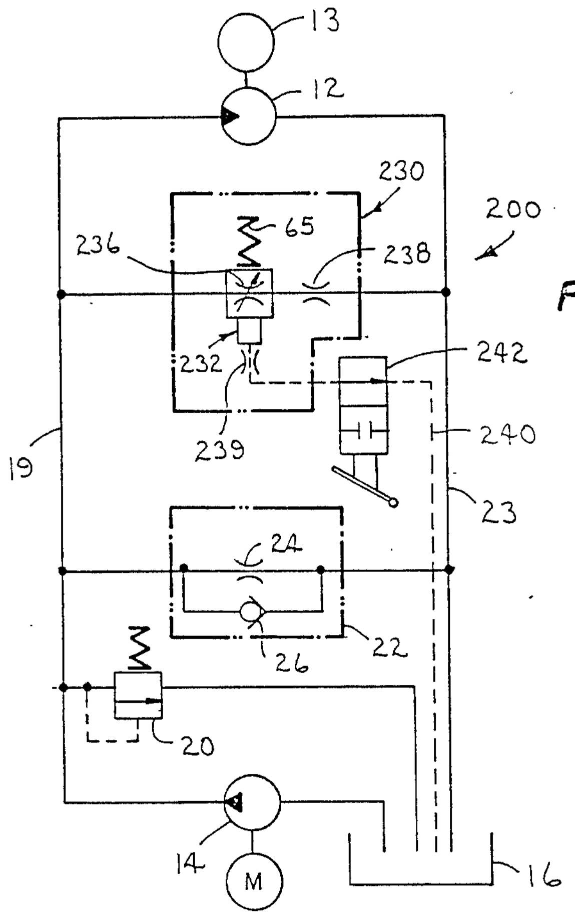
FIG. 5 is a schematic diagram of a hydraulic control circuit in accordance with an alternate embodiment of the present invention.

Referring now to FIG. 5 an alternate embodiment of a control system in accordance with the present invention is illustrated and generally designated by the numeral 200. The control system 200 includes the motor 12 connected to a load 13, and the motor is in circuit with the pump 14 and reservoir 16. The circuit illustrated in FIG. 5 also includes the conventional pressure relief valve 20 and the speed control valve 22 interconnected between the fluid supply line 19 and return line 23. The control system 200 includes a modified pressure limiting acceleration control valve, generally designated by the numeral 230 which includes a pilot actuator 232 adapted to receive pilot pressure fluid from a line in communication with a timing orifice 239. The valve 230 may also includes a valve shift control orifice 238 arranged in a manner in accordance with either of the valve embodiments previously described. The valve 230 is substantially the same as the valve 30 or 130 except the plug 74, as previously mentioned, is replaced by a suitable fitting which provides for connecting a pilot fluid drain line 240 to a lever actuated on-off valve 242. When the valve 242 is open pilot pressure cannot increase in the pilot actuator 232 to effect movement of the closure member and the valve 230 remains in the full open condition. However, upon shifting the valve 242 to the closed position pressure will increase in the pilot actuator 232 as the orifice 238 will present enough restriction to fluid flow through the valve 230 to effect operation of the pilot actuator 232 to commence closure of the closure member 236 in a manner similar to the operation of the valves 30 and 130.

Figure 6:
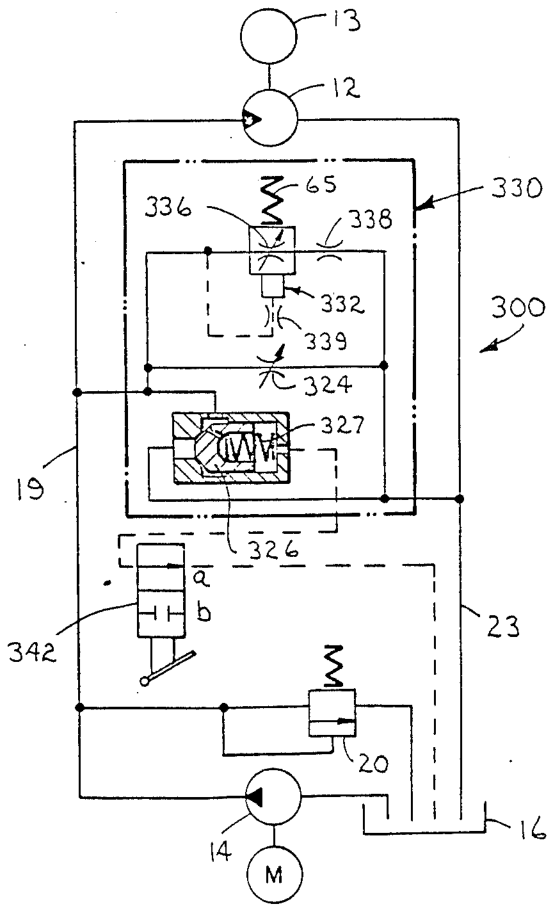
FIG. 6 is a schematic diagram of a second alternate embodiment of a hydraulic motor control circuit in accordance with the present invention.

Referring now to FIG. 6 there is shown a second alternate embodiment of a pressure limiting and acceleration control system for hydraulic motors, generally designated by the numeral 300. The control system 300 includes the motor 12 and driven load 13, the pump 14, a pump supply line 19 interconnecting the pump and the motor 12, a return line 23 and fluid reservoir 16. The control system 300 includes; however, a combined motor throttoling or on-off valve, speed control valve and pressure limiting and acceleration valve, generally designated by the numeral 330. The valve 330 comprises an adjustable motor speed control orifice 324, a pilot actuated check valve 326 and a pressure limiting and acceleration control closure member 336 which is operated by a pilot actuator 332 having a timing orifice 339. The valve 330 also includes a shifting control orifice 338 and a closure member biasing spring 65. The pilot actuated check valve 326 is biased closed by a spring 327 and is operated in certain modes of operation of the system 300 by a manually operable two-way or on-off control valve 342 which, in its position a, is operable to bleed fluid off of an actuator for the check valve 326 allowing same to be biased open by pump discharge flow to shunt or bypass fluid back to the reservoir 16. When the valve 342 is in its position b pilot pressure fluid acting on the check valve actuator from line 19 will hold the check valve 326 in a closed position to force fluid flow from the pump 14 to flow through the motor 12 and/or valve 336. Accordingly, in starting the load driven by the motor 12 the valve 342 is shifted from its position a to its position b to allow the check valve 326 to close. This action will commence closure of the closure member 336 thanks to the presence of the shifting orifice 338 and the rate of closure will be controlled by the timing orifice 339 and the pilot actuator 332 so that a progressive closing of the closure member 336 will occur to smoothly accelerate the motor 12 by progressively forcing all of the pump discharge flow through the motor 12 instead of being bypassed through the valve 330. A certain portion of the fluid flow from the pump 14 to the motor 12 may be selectively bypassed through the speed control orifice 324 to set the maximum speed of the motor 12 for a given operating condition of the pump 14.

When it is desired to shut down the motor 12 under control of the system 300 the valve 342 is moved to its position a to cause the check valve 326 to open and bypass flow from the pump 14 back to the reservoir 16. Moreover, the check valve 326 is also operable to prevent severe cavitation or other fluid flow problems associated with an overrunning or free wheeling condition of the motor 12 such as might occur during motor shutdown.

One advantage of the control systems 200 and 300 resides in the fact that the valves 230 or 330 may be disposed in the respective systems at any preselected point between the pump 14 and the motor 12 and the only control valve required is the pilot control valve 242 or 324 which may be conveniently located at an operator control station. Since the valves 242 and 342 require only a relatively small diameter pilot fluid control line to be connected between the respective acceleration control valves and the reservoir 16 these arrangements are more conveniently utilized in control systems wherein the control station is remote from the main lines of the hydraulic circuit.

Those skilled in the art will appreciate from the foregoing description that several embodiments of a unique pressure limiting acceleration control system for hydraulic motors have been provided in accordance with the present invention including embodiments of a unique acceleration control valve. Those skilled in the art will further appreciate that various substitutions and modifications may be made to the embodiments described in detail herein without departing from the scope and spirit of the invention as recited in the appended claims.

What I claim is:

1. In a hydraulic system including a pump and hydraulic motor means adapted to be supplied with pressure fluid by said pump through a flow circuit interconnecting said pump and said motor means, means for limiting the peak pressure imposed on said motor means in response to introducing full load fluid flow through said circuit to drive said motor means, said pressure limiting means comprising:

a self-closing valve adapted for progressive throttling of fluid flow through said circuit between said pump and said motor means in response to a predetermined pressure condition of fluid flowing through said valve, said valve comprising:

a body including a bore for receiving a closure member and a surface defining valve seat means, a fluid inlet port and a fluid discharge port opening into said bore;

a cylindrical closure member disposed in said bore including a portion cooperable with said seat means for throttling fluid flow through said valve, said closure member having an end surface;

biasing means for urging said closure member toward a valve open position;

means in said valve for predetermining a pressure condition in said valve resulting from introduction of full load fluid flow to said motor means for urging said valve to close against said biasing means;

a pilot pressure fluid actuator including passage means extending through said end surface of said closure member and in communication with fluid flowing through said valve at a point upstream of said seat means for conducting pressure fluid to said pilot actuator, said pilot pressure fluid actuator further including a pilot pressure fluid chamber, defined in part by said end surface of said closure member, for receiving pressure fluid from said passage means; and orifice means in said passage means for limiting the rate of fluid flow to said pilot actuator to cause said closure member to progressively throttle the flow of fluid through said valve.

2. A self-closing valve adapted for progressive throttling of fluid flow from a source in response to a predetermined pressure condition of fluid flowing through said valve, said valve comprising:

a body including a bore for receiving a closure member and a surface defining valve seat means for slidably receiving the closure member for movement therein, a fluid inlet portion and a fluid discharge port opening into said bore;

a cylindrical closure member disposed in said bore for movement into and out of sliding engagement with said valve seat means and including a portion cooperable with said valve seat means for progressively throttling fluid flow through said valve during sliding movement of said closure member within said valve seat means;

biasing means for urging said closure member toward a valve open position;

pilot pressure fluid actuator means operable to move said closure member toward said valve seat means to cause said closure member to progressively throttle the flow of fluid through said valve during movement of said closure member toward said valve seat means;

passage means in communication with fluid flowing through said valve at a point upstream of said valve seat means for conducting pressure fluid to said pilot actuator means to operate the same; and orifice means in said passage means for limiting the rate of flow therethrough to said pilot actuator means.

3. The valve set forth in claim 2 wherein:

said closure member includes a plurality of longitudinal grooves formed therein and of different lengths, respectively, said grooves being cooperable with said seat means in response to movement of said closure member to progressively throttle the flow of fluid through said valve.

4. A control system for operating a positive displacement hydraulic motor, said control system including:

a hydraulic pump operable to deliver hydraulic fluid to said motor through as fluid supply line;

means for initiating fluid flow to said hydraulic motor through said supply line; and valve means, responsive to the flow of fluid therethrough to be progressively urged to a closed condition upon initiation of fluid flow from said hydraulic pump through said fluid supply line, for shunting at least a portion of said fluid to a low pressure return circuit and to progressively reduce the shunted fluid flow to effect acceleration of said motor, said valve means being interposed in conduit means in said control system and including a closure member operable by a pilot actuator responsive to the pressure of fluid flowing through said valve means to commence closing said closure member at a predetermined pressure, said pilot actuator including a pilot fluid passage in communicating with passage means in said valve means, and a flow restricting orifice in said pilot fluid passage for limiting the pressure rate of rise in said pilot actuator to effect closure of said valve means without incurring a damaging overpressure condition in said motor.

5. The control system set forth in claim 4 wherein:

said valve means includes means for biasing said closure member in a valve open condition, and flow control means operable to restrict fluid flow through said valve means sufficiently to cause said pilot actuator to commence closing said valve means against the urging of said biasing means upon initiation of fluid flow to said motor.

6. The control system set forth in claim 4 including:

a shutoff valve interposed in said supply line and operable to move from a valve closed condition to a fully open position to initiate fluid flow to said motor.

7. The control system set forth in claim 4 including:

fluid flow bypass means including a flow restriction for bypassing a controlled quantity of fluid around said motor to control the operating speed of said motor.

8. A control valve for controlling fluid flow in a hydraulic circuit having a source of pressure fluid and motor means connected to said source by a fluid supply conduit, said control valve comprising:

a valve body including a cylindrical bore, an inlet port, a discharge port and valve seat means, said inlet port being adapted to be in fluid flow communication with said supply conduit;

a closure member slidable in said bore and with respect to said seat means to substantially close off fluid flow through said valve, said closure member including a transverse end face forming a fluid pressure surface, means for biasing said closure member in a valve open condition to permit substantial flow of fluid through said valve; and pressure sensing means operable to sense the pressure of fluid flowing through said valve at a predetermined point in said valve for progressively closing said closure member to divert fluid flow to said motor means, said pressure sensing means including pivot actuator means including said fluid pressure surface, and passage means formed in said closure member in communication with fluid at the pressure upstream of said seat means and with a pilot pressure fluid chamber formed in part by said face on said closure member for conducting pressure fluid to act on said fluid pressure surface for urging said closure member toward said seat means.

9. The control valve set forth in claim 8 including:

orifice means interposed in said passage means for limiting the rate of fluid flow to said pilot actuator means.

10. The control valve set forth in claim 9 wherein:

said orifice means includes a restricted flow passage formed in a plug removably insertable in a bore in said closure member, said bore forming a portion of said passage means.

11. The control valve set forth in claim 8 wherein:

said closure member comprises a cylindrical spool slidably disposed in a bore in said body, said spool including opposed head portions and a reduced diameter portion disposed between said head portions, and said body includes a cylindrical groove formed in said bore and defining a land forming said seat means, said land being cooperable with one of said head portions of said closure member to substantially close off fluid flow through said valve.

12. The control valve set forth in claim 11 wherein:

said one head portion includes a plurality of longitudinal grooves formed therein and of different lengths, respectively, said grooves being cooperable with said land in response to movement of said spool to progressively throttle the flow of fluid through said valve.

13. The control valve set forth in claim 11 wherein:

said head portion of said spool includes a plurality of circumferential grooves and lands forming seal means between said spool and said bore in said body.

14. A control valve adapted for controlling fluid flow in a hydraulic circuit having a source of pressure fluid and motor means connected to said source by a fluid supply conduit, said control valve comprising:

a valve body including an inlet port, a discharge port and valve seat means, said inlet port being adapted to be in fluid flow communication with said supply conduit;

a closure member movable in said body and with respect to said seat means to substantially close off fluid flow through said valve;

means for biasing said closure member in a valve open condition to permit substantial flow of fluid through said valve;

pressure sensing means operable to sense the pressure of fluid flowing through said valve at a predetermined point for progressively closing said valve to divert fluid flow from said motor means, said pressure sensing means including a pilot actuator including means forming a pressure surface, and passage means in communication with fluid at the pressure upstream of said seat means for conducting pressure fluid to act on said pressure surface for urging said closure member toward said seat; and an orifice formed in a plug removably insertable in said body through said discharge port, and interposed in the flow path of fluid flowing through said valve for restricting the fluid flow through said valve sufficiently to cause said closure member to commence moving toward a fluid flow throttling position.

15. The control valve set forth in claim 14 wherein:

said plug is retained in said body by a fitting releasably connectable to said body at said discharge port.

* * * * *